United States Patent [19]

Jordan

[11] 4,111,576

[45] Sep. 5, 1978

[54] STEERING LINKAGE HAVING RESILIENT RING

[75] Inventor: David D. Jordan, South Bend, Ind.

[73] Assignee: The Bendix Corporation, Southfield, Mich.

[21] Appl. No.: 826,607

[22] Filed: Aug. 22, 1977

[51] Int. Cl.² .............................................. F16C 11/00
[52] U.S. Cl. ............................... 403/134; 277/212 FB; 403/288
[58] Field of Search ............... 403/132, 133, 134, 135, 403/136, 137, 138, 139, 140, 144, 34, 35, 36, 37, 38, 39, 288; 277/212 FB

[56] References Cited

U.S. PATENT DOCUMENTS

| | | | |
|---|---|---|---|
| 1,809,971 | 6/1931 | Hufferd | 403/35 |
| 2,281,097 | 4/1942 | Flumerfelt | 403/36 |
| 2,635,906 | 4/1953 | Graham et al. | 403/36 |
| 3,381,987 | 5/1968 | Husen | 277/212 FB |
| 3,527,316 | 9/1970 | Jones, Jr. et al. | 403/39 X |
| 3,574,369 | 4/1971 | Andrew | 403/133 X |

*Primary Examiner*—Werner H. Schroeder
*Assistant Examiner*—Conrad L. Berman
*Attorney, Agent, or Firm*—Paul David Schoenle; Ken C. Decker

[57] ABSTRACT

A steering linkage includes a housing which movably supports a sleeve member within a housing bore. The sleeve carries a socket which receives a stud and the stud extends through openings in the sleeve member and the housing. A flexible boot sealingly engages the stud and the housing to retain lubricant within the housing bore and keep out contaminants. As the stud is movable relative to the housing and sleeve member openings, the stud carries a resilient ring opposing the flexible boot to prevent the flexible boot from coming in contact with the sleeve and housing openings, thereby preventing the flexible boot from being pinched by the movable parts within the housing bore. The resilient ring is larger in diameter than the sleeve member opening and is disposed substantially within the housing opening.

5 Claims, 2 Drawing Figures

STEERING LINKAGE HAVING RESILIENT RING

BACKGROUND OF THE INVENTION

In a steering linkage a flexible boot generally engages a stud and a housing to cover the opening on the housing through which the stud projects and to seal the interior of the housing from the exterior thereof. The stud is mounted within a sleeve member in a bore within the housing for axial as well as pivotal movement relative to the housing. Consequently, the housing opening forms a large clearance with the stud to permit movement of the stud relative to the housing.

With such a large clearance or spacing between the stud and the housing opening, the flexible boot, or a portion thereof, is free to position itself within the housing opening or within the housing bore. If the stud moves or pivots while the flexible boot is positioned within the housing opening, the flexible boot is pinched between the stud and the wall of the housing opening so that slitting or cutting of the flexible boot is possible, thereby exposing the interior of the housing to contaminants and permitting leakage of lubricant from the housing bore. Moreover, if the flexible boot is positioned within the housing bore, the sleeve member is movable relative to the housing, thereby also slitting or cutting the flexible boot.

SUMMARY OF THE INVENTION

The present invention provides a simple and economical structure for preventing slitting or cutting of the flexible boot in a steering linkage wherein the stud is axially movable and pivotal relative to the housing.

In particular, the sleeve member is slidably disposed within a cylindrical housing bore and a socket is carried by the sleeve member. The stud includes an integral ball which is received within the socket and the stud extends through openings on the sleeve member and the housing. The flexible boot sealingly engages the portion of the stud projecting outwardly of the housing to seal the clearance or spacing between the stud and the housing, thereby keeping out contaminants. A resilient ring is carried by the stud radially inwardly of the sealing engagement with the flexible boot. The resilient ring's outer diameter is larger than the diameter of the sleeve member opening, where the stud projects therethrough, so that the resilient ring is prevented from moving inside the sleeve member. The resilient ring is positioned on the stud such that its radial location relative to the axis of the housing is substantially in radial alignment with the housing opening. Therefore, the resilient ring partially covers the housing opening to prevent entry of the flexible boot. The resilient ring also permits movement of the stud within the housing opening, even if the resilient ring is in engagement with the wall of the housing opening, as the resilient ring is deformable when the stud approaches the wall of the housing opening.

It is an object of the present invention to provide a simple and economical structural improvement to a steering linkage whereby the flexible boot that sealingly engages the stud is prevented from being pinched between the stud and the housing.

DETAILED DESCRIPTION

Figure 1:
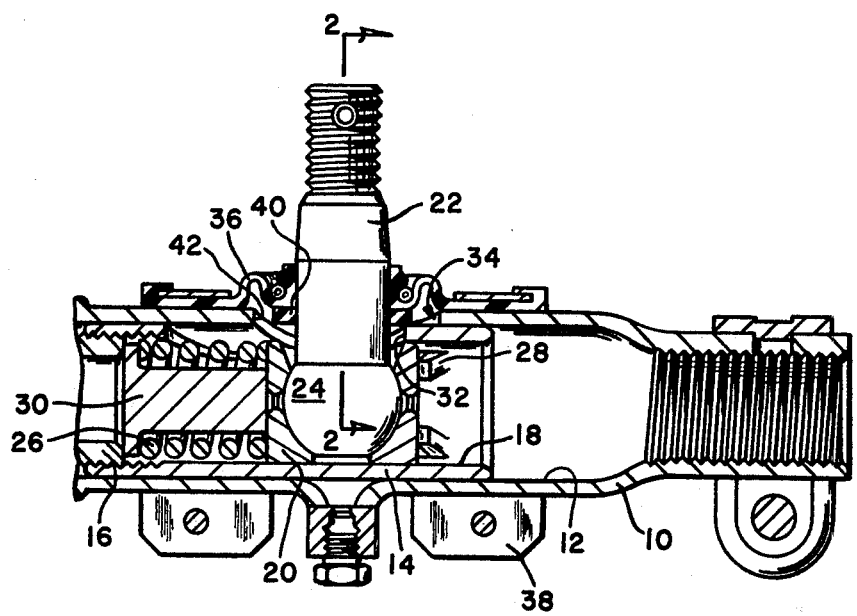
FIG. 1 is a partial cross-sectional view of a steering linkage showing the present invention.

In the steering linkage illustrated in FIG. 1, a housing 10 includes a stepped bore 12 within which a sleeve member 14 is slidably and rotatably disposed. A member 16 is received within a sleeve member bore 18 and is operatively connected to a steering control mechanism (not shown) for imparting axial movement to the sleeve member 14.

The sleeve member bore 18 also receives a pair of sockets 20 which pivotally support a stud 22 via a ball 24 formed integrally with the stud 22. A spring 26 biases the sockets 20 towards a plurality of tabs 28 on the sleeve member 14 and a spacer 30 maintains the sockets in spaced relation to the member 16.

Extending radially outwardly from the socket 20, the stud 22 projects through a sleeve member opening 32 and a housing opening 34 to extend from the housing 10. A flexible boot 36 sealingly engages the stud and the housing by means of a clamp 38. The sleeve member opening 32 includes an enlarged portion opposite spring 26 for receiving the ball 24.

Figure 2:
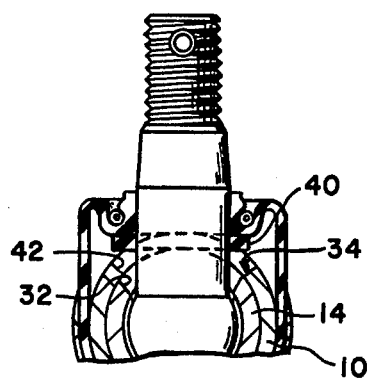
FIG. 2 is a cross-sectional view taken along line 2—2 of FIG. 1.

In accordance with the invention, a ring 40 is supported by the stud 22 in order to prevent the flexible boot 36 from coming in contact with the movable sleeve member 14 and also to prohibit the flexible boot 36 from being pinched between the stud 22 and the wall 42 of the housing opening 34. Viewing FIG. 2, it is seen that the ring 40 abuts the sleeve member 14 adjacent the sleeve member opening 32. Consequently, the ring 40 is disposed substantially in radial alignment with the housing opening 34. Moreover, the sleeve member opening 32 is substantially elliptical and the minor axis thereof, viewing FIG. 2, is less than the diameter of the ring 40 so that the ring will not extend into the sleeve member opening 32. Preferably, the ring 40 is made of a resilient material; however, other types of rings can be used.

When the stud 22 is pivoted relative to the socket 20, viewing FIG. 2, the resilient ring 40 is pivoted into contact with the wall 42 of the housing opening 34. Consequently, if the flexible boot 36 happens to extend into the housing opening 34, the resilient ring 40 would contact the flexible boot and yieldably squeeze the latter between the wall of the housing opening and the resilient ring. In view of the resilient ring 40, the stud 22 is prevented from contacting the wall 42 of the housing opening 34, so that, if the flexible boot extends into the axial spacing between the resilient ring and the wall of the housing opening and, if the stud rotates to urge the resilient ring towards the wall of the opening, the flexible boot and resilient ring will deform to accommodate the rotation of the stud. This is in contrast to the prior art wherein the stud abuts the wall of the housing opening to form cutting edges, which contact the flexible boot when the latter extends into the spacing between the stud and the wall of the housing opening, thereby subjecting the flexible boot to slitting by the cutting edges.

In the preferred embodiment, the resilient ring thickness is substantially equal to the radial thickness of the housing. Moreover, the resilient ring is made of rubber ES-0840.

Although many variations of the present invention will be apparent to those skilled in the art, it is intended that these variations fall within the scope of the appended claims.

I claim:

1. In a steering linkage having a housing which defines a bore, a sleeve member movable and rotatable within the housing bore and supporting a socket, a stud extending through an opening on the housing and into the socket such that the sleeve member is movable and rotatable within the housing bore to impart movement and rotation to the stud and a flexible boot sealingly engaging the stud and the housing to keep contaminants out of the housing bore, the improvement in which a ring is carried by said stud between said sleeve member and said flexible boot, said ring cooperating with said stud to prevent said flexible boot from coming in contact with said sleeve member.

2. The steering linkage of claim 1 in which said sleeve member includes a substantially elliptical opening having minor and major axes, said stud extending through the substantially elliptical opening and said ring having an outer diameter which is larger than the minor axis of the substantially elliptical opening.

3. In a steering linkage having a housing which defines a bore, a sleeve member movable and rotatable within the housing bore and supporting a socket, a stud extending through an opening on the housing and into the socket such that the sleeve member is movable and rotatable within the housing bore to impart movement and rotation to the stud and a flexible boot sealingly engaging the stud and the housing to keep contaminants out of the housing bore, the improvement in which a resilient ring is carried by said stud between said sleeve member and said flexible boot, said resilient ring being disposed at a radial position on said stud which is substantially in radial alignment with the wall of said housing opening, said stud being rotatable relative to said housing to urge said resilient ring into engagement with the wall of said housing opening.

4. The steering linkage of claim 3 in which said resilient ring includes a thickness substantially equal to the thickness of said housing.

5. The steering linkage of claim 3 in which said resilient ring is substantially disposed within said housing opening to oppose entry of said flexible boot into said housing opening.

* * * * *